United States Patent
Manohar et al.

(10) Patent No.: US 11,081,955 B2
(45) Date of Patent: Aug. 3, 2021

(54) UNIDIRECTIONAL RING MITIGATION IN A VOLTAGE CONVERTER

(71) Applicant: TEXAS INSTRUMENTS INCORPORATED, Dallas, TX (US)

(72) Inventors: Sujan K. Manohar, Dallas, TX (US); Shailendra Baranwal, Murphy, TX (US); Jeffrey Morroni, Parker, TX (US); Michael Lueders, Freising (DE); Yogesh Ramadass, San Jose, CA (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 65 days.

(21) Appl. No.: 15/716,647

(22) Filed: Sep. 27, 2017

(65) Prior Publication Data

US 2018/0294710 A1 Oct. 11, 2018

Related U.S. Application Data

(60) Provisional application No. 62/483,538, filed on Apr. 10, 2017.

(51) Int. Cl.
*H02M 1/14* (2006.01)
*H02M 3/06* (2006.01)
*H02M 3/158* (2006.01)
*H02M 3/155* (2006.01)

(52) U.S. Cl.
CPC .............. *H02M 1/14* (2013.01); *H02M 3/06* (2013.01); *H02M 3/155* (2013.01); *H02M 3/1588* (2013.01)

(58) Field of Classification Search
CPC .......... H02M 1/14; H02M 3/06; H02M 3/155; H02M 3/1588
See application file for complete search history.

(56) References Cited

U.S. PATENT DOCUMENTS

| | | | | |
|---|---|---|---|---|
| 4,801,887 | A | * | 1/1989 | Wegener .................. G05F 3/18 327/104 |
| 2001/0024373 | A1 | * | 9/2001 | Cuk ........................ H02M 1/44 363/16 |
| 2011/0267142 | A1 | * | 11/2011 | Wismar ................ H02M 3/158 330/129 |
| 2012/0262139 | A1 | * | 10/2012 | Moussaoui ............. H02M 1/44 323/282 |
| 2012/0294056 | A1 | * | 11/2012 | Temesi ............. H03K 17/08128 363/131 |

(Continued)

*Primary Examiner* — Emily P Pham
(74) *Attorney, Agent, or Firm* — Mark Allen Valetti; Charles A. Brill; Frank D. Cimino

(57) ABSTRACT

A system includes a high side transistor switch coupled to a first voltage node and a low side transistor switch coupled to the high side transistor switch at a switch node. The system further includes a unidirectional decoupling capacitor circuit including a capacitive component. The unidirectional decoupling capacitor circuit is coupled between the first voltage node and a common potential. Responsive to a voltage on the first voltage node being more than a threshold greater than an input voltage to the first voltage node, the unidirectional decoupling capacitor circuit is configured to sink current from the first voltage node to the capacitive component. The capacitive component can therefore be charged, with the charge used to subsequently power a load.

19 Claims, 1 Drawing Sheet

(56) References Cited

U.S. PATENT DOCUMENTS

| | | | |
|---|---|---|---|
| 2014/0204623 A1* | 7/2014 | Djenguerian | H02M 1/36 363/21.12 |
| 2014/0231243 A1* | 8/2014 | Finley | H05H 1/46 204/192.12 |
| 2014/0239933 A1* | 8/2014 | Galinski | H02M 3/156 323/285 |
| 2015/0155863 A1* | 6/2015 | Takasu | H03K 17/08142 327/108 |
| 2016/0036330 A1* | 2/2016 | Sturcken | H02M 3/1584 323/271 |

* cited by examiner

UNIDIRECTIONAL RING MITIGATION IN A VOLTAGE CONVERTER

RELATED APPLICATIONS

This application claims priority to U.S. Provisional Application No. 62/483,538, filed Apr. 10, 2017, titled "Unidirectional Decoupling Capacitor Circuit for DC-DC Power Converters," which is incorporated herein by reference.

BACKGROUND

With the proliferation of portable devices such as smart phones, tablets, notebook computers, etc., integrated power management circuits in such devices control the various voltages used by the devices. A direct current (DC)-to-DC converter, for example converts one DC voltage level to another DC voltage level. Some devices have a need for more than one DC voltage and thus DC-to-DC converters that can produce multiple different DC voltages may be beneficial. Some voltage converters are switching voltage converters in which a transistor switches on and off to produce a regulated output voltage. Voltage ringing may occur during a transistor's transition from an off state to an on state, or vice versa, due to parasitic supply loop inductance between the active circuit of an integrated circuit (IC) and an external decoupling capacitor. That is, turning a transistor on or off may cause a voltage on a node within the voltage converter to ring. Voltage ringing poses reliability challenges to the system.

SUMMARY

In some embodiments, a system includes a high side transistor switch coupled to a first voltage node and a low side transistor switch coupled to the high side transistor switch at a switch node. The system further includes a unidirectional decoupling capacitor circuit including a capacitive component. The unidirectional decoupling capacitor circuit is coupled between the first voltage node and a common potential. Responsive to a voltage on the first voltage node being more than a threshold greater than an input voltage to the first voltage node, the unidirectional decoupling capacitor circuit is configured to sink current from the first voltage node to the capacitive component. The capacitive component can therefore be charged, with the charge used to subsequently power a load.

In another embodiment, a voltage converter includes a high side transistor switch coupled to a first voltage node, a low side transistor switch coupled to the high side transistor switch at a switch node, an output inductor connected to the switch node, and an output capacitor connected between the output inductor and a common potential. The voltage converter further includes a series combination of a diode and a capacitive component connected between the first voltage node and the common potential.

In yet another embodiment, a system includes a high side transistor switch coupled to a first voltage node, a low side transistor switch coupled to the high side transistor switch at a switch node, and a unidirectional decoupling circuit including a charge storage component. The unidirectional decoupling circuit is coupled between the first voltage node and a common potential. Responsive to a voltage on the first voltage node being more than a threshold greater than an input voltage to the first voltage node, the unidirectional decoupling circuit is configured to sink current from the first voltage node to charge the charge storage component.

BRIEF DESCRIPTION OF THE DRAWINGS

For a detailed description of various examples, reference will now be made to the accompanying drawings in which.

DETAILED DESCRIPTION

Electrical systems may include voltage converters that convert an input voltage of one voltage level to a different voltage level. Some voltage converters include a high side transistor switch coupled to a low side transistor switch. Energy stored in parasitic inductance caused by wire bonds to the voltage converter, circuit board traces, etc. may cause ringing when the high side transistor switch is switched on or off. Such ringing may cause voltage/current stress on the transistor switch which may cause a power transistor to be sized appropriately to dissipate an anticipated amount of ringing energy, or may require higher voltage rated switches which may occupy more area than lower voltage rated switches. A larger transistor switch, however, occupies more area, costs more and is less efficient than a smaller transistor. An alternative or additional approach to address the ringing problem may be to drive the high and low side transistors more slowly, that is, causing the transistor switches to change between on and off states more slowly. While adequate to reduce ringing, slowing down the transition times for the transistor switches unfortunately extends the period of time during which the transistor switch has a non-zero voltage across its drain and source terminals while also flowing a current through the transistor (sometimes referred to as the "IV overlap" or transitional losses). Power is dissipated by the transistor during IV overlap, which reduces the overall efficiency of the converter.

In accordance with various embodiments, a voltage converter includes a high side transistor switch coupled to a first voltage node, and a low side transistor switch coupled to the high side transistor switch at a switch node. The converter also includes a unidirectional decoupling capacitor circuit that includes a charge storage device. In some embodiments, the charge storage device is a capacitive component (e.g., a capacitor). The unidirectional decoupling capacitor circuit is coupled between the first voltage node and a common potential (e.g., ground). Responsive to a voltage on the first voltage node being more than a threshold greater than an input voltage to the power converter circuit (e.g., when the voltage on the first voltage node begins to ring), the unidirectional decoupling capacitor circuit is configured to sink current from the first voltage node to the capacitive component. The capacitive component begins to charge thereby reducing the magnitude of the ringing voltage on the first voltage node. The unidirectional decoupling capacitor circuit may include a diode that prevents the capacitive component from discharging through the high side switch. Instead, the charge on the capacitive component can be used to provide power to another load within the system that needs to be powered.

Figure 1:
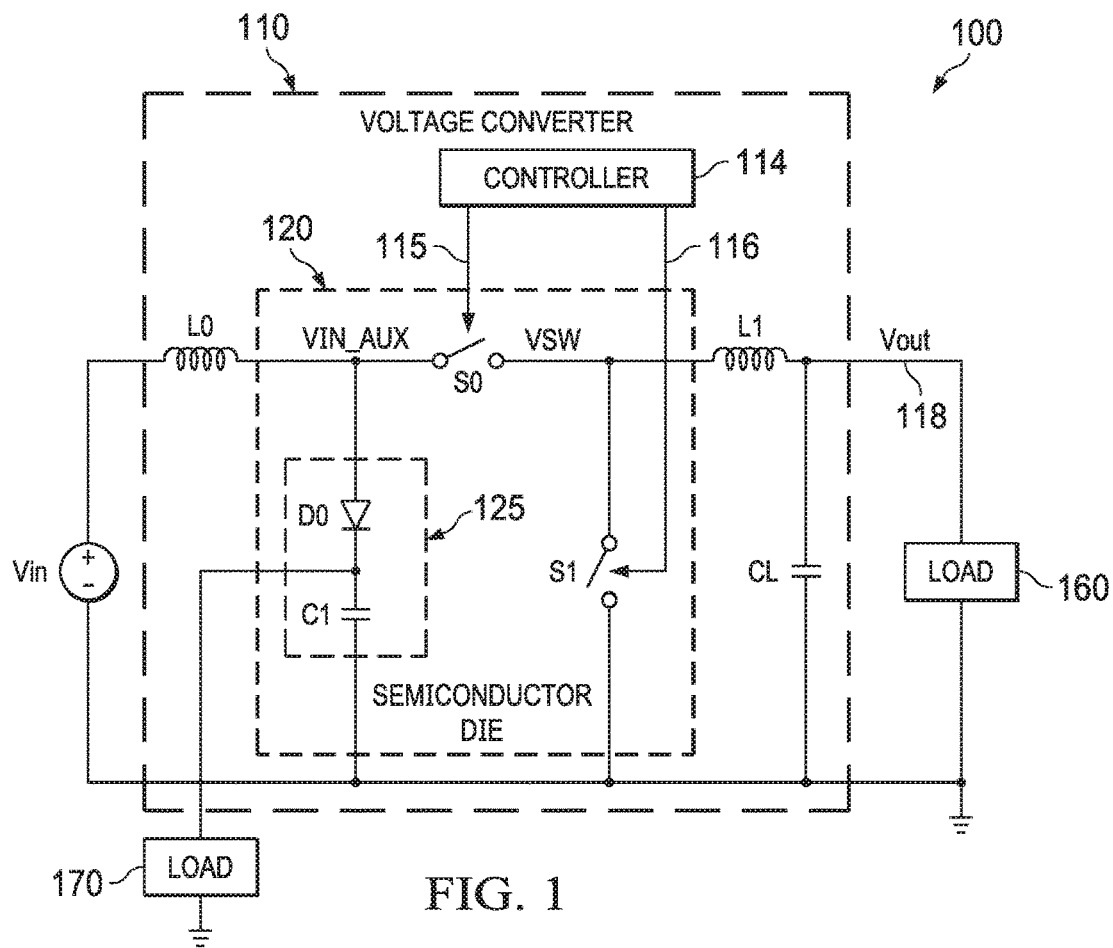
FIG. 1 shows an example of a voltage converter including a unidirectional decoupling capacitor circuit.

FIG. 1 shows an example of an electrical system 100 that includes a buck voltage converter 110, which generates an output voltage Vout based on an input voltage Vin. In some embodiments (such as for buck converters), Vout is a voltage (e.g., 1.2V) that is lower in magnitude than Vin (e.g., 5V). In other cases, the voltage converter may be a buck-boost converter in which Vout is greater than Vin. The voltage converter 110 may be coupled to a load 160 and Vout is used to power the load. In some cases, the electrical system 100 is a battery-operated device such as a smart phone, a tablet computer, etc. and the load comprises one or more circuits within the device such as a processor, memory, a display, etc. In various embodiments, the input and output voltages Vin and Vout comprise DC voltages.

The illustrative buck voltage converter 110 comprises a high side transistor switch S0, a low side transistor switch S1, an inductor L1, a load capacitor CL, a controller 114, and a unidirectional decoupling capacitor circuit 125. Each transistor switch S0 and S1 comprises a metal oxide semiconductor field effect transistor (MOSFET), although other types of transistors can be used as well. The high and low side transistor switches S0 and S1 are coupled together at a node designated in the example of FIG. 1 as the switch node (VSW). Inductor L1 couples to the switch node VSW and to load capacitor CL. The node 118 connecting the inductor L1 to the load capacitor CL provides the output voltage Vout to the load 160.

The controller 114 may comprise a pulse width modulation (PWM) controller which, through control signals 115 and 116, controls the high and low side transistor switches S0 and S1, respectively. The controller 114 is configured to turn on one but not both of the transistor switches S0 and S1 at any point in time, and at times the controller 114 causes both transistors to be off. When high side transistor switch S0 is on (and S1 is off), the voltage on VSW is high (i.e., Vin). Conversely, when low side transistor switch S1 is on (and S0 is off), the voltage on VSW is low. Thus, the voltage on VSW toggles between high and low as the transistor switches S0 and S1 are toggled on and off by the controller 114. The inductor L1 causes the output voltage Vout on node 118 to be approximately the average voltage on VSW. The input voltage Vin is provided to the voltage converter. By controlling the duty cycle of the transistor switches by the controller 114, the output voltage Vout can be tightly controlled relative to the input voltage Vin.

At least some of the components shown in the example of FIG. 1 are provided on a common semiconductor die. In the example circuit of FIG. 1, the unidirectional decoupling capacitor circuit 125, high side transistor switch S0, and low side transistor switch S1 are fabricated on a common semiconductor die 120. The controller 114 may not be on the die 120 in some embodiments, but can be fabricated on die 120 in other embodiments. The unidirectional decoupling capacitor circuit 125 is integrated into the same die (i.e., chip) that contains the high and low side transistor switches. In other embodiments, the decoupling capacitor circuit 125 is not integrated into the same die as the high and low side transistor switches, but is provided within the same IC package as the die containing the high and low side transistor switches. The semiconductor die 120 may be mounted to a printed circuit board and electrically connected to pads on the printed circuit board by way of, for example, wire bonds. Such bonds and associated traces on the printed circuit board have parasitic supply loop inductance that is represented in the circuit schematic of FIG. 1 as L0. The node between the parasitic inductor L0 and the high side transistor switch S0 is designated as the input auxiliary node (VIN_AUX).

In the example of FIG. 1, the unidirectional decoupling capacitor circuit 125 is connected between the VIN_AUX node and a common potential (e.g., ground). The illustrative unidirectional decoupling capacitor circuit 125 comprises a diode D0 and a capacitor C1. The diode D0 and capacitor C1 are connected in series. Capacitor C1 may be on the die 120 as shown, or on a separate die or circuit board. As shown in FIG. 1, the anode of diode D0 may be connected to node VIN_AUX and the cathode to one plate of capacitor C1 with the capacitor's other plate connected to the common potential. Alternatively, the diode D0 and capacitor C1 can be connected in series in the opposite order, that is, capacitor C1 connected to VIN_AUX with the anode of the diode D0 connected to the capacitor and the diode's cathode connected to the common potential.

The capacitor C1 also may be implemented as a MOSFET with its drain shorted to its source and one capacitor plate comprising the gate and the opposing capacitor plate comprising the drain-source structure. Alternatively, the capacitor C1 may be implemented as other types of pair of parallel plates besides a MOSFET. As noted above, capacitor C1 can be a discrete capacitor integrated within the IC package, or may be formed on the same die 120 as the switches S0 and S1. In general, the capacitor C1 is any suitable type of capacitive component, and diode D0 is any suitable type of diode component that permits current to flow only in one direction.

The operation of the voltage converter 110 of the example of FIG. 1 is as follows. The controller 114 controls the on and off states of the high and low side transistor switches S0 and S1. When the high side transistor switch S0 is off and the low side transistor switch S1 is on, the switch node VSW is equal or approximately equal to 0 (e.g., the common potential). The controller 114 then turns off S1. At that point in time, both transistor switches S0 and S1 are off thereby creating a "dead time" which avoids simultaneous conduction of both the high and low side transistor switches S0 and S1 from Vin to the common potential (e.g., ground). During the dead time, the voltage on the switch node VSW may drop by approximately 0.7V due to the body diode internal to transistor switch S1 turning on to supply current to the load 160.

When transistor switch S0 is not in the process of being turned on or off, and thus is either fully on or fully off, the current through the parasitic supply loop inductor L0 is constant and thus not changing (di/dt=0). With the current through the parasitic inductor L0 being constant, the voltage drop across the parasitic inductor L0 is 0, which means the voltage on the VIN_AUX node is equal to Vin.

Figure 2:
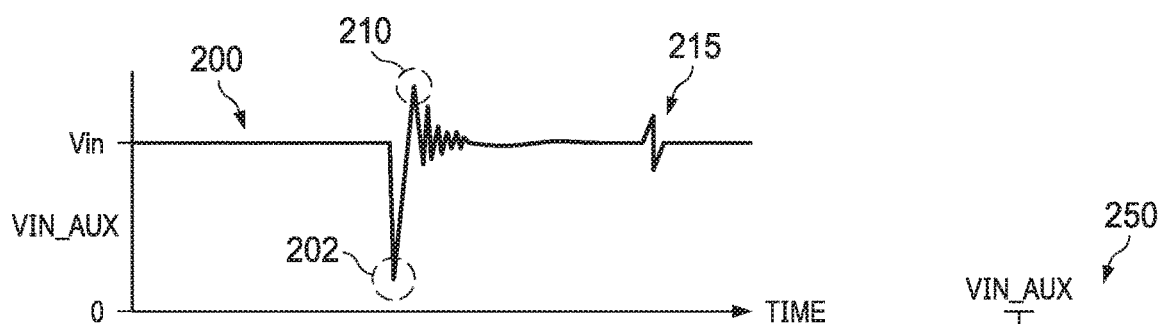
FIG. 2 shows an illustrative waveform of a voltage within the voltage converter.

The controller 114 asserts control signal 115 to turn on the high side transistor switch S0, while S1 remains off. When high transistor switch S0 begins to turn on, the current through the inductor begins to increase which causes a voltage drop to be generated across the inductor. The voltage drop is given by L*di/dt and may approximately equal Vin. FIG. 2 shows a portion of a waveform illustrating the VIN_AUX voltage. At 200, the high side transistor switch S0 is off and the voltage on the VIN_AUX node is equal to Vin. Once the high side transistor switch S0 begins to turn on, the voltage on VIN_AUX drops to approximately 0 V as shown at 202. At this point, the voltage on both VIN_AUX and the switch node VSW are approximately the same. The high side transistor switch S0 continues to turn on and does so with zero voltage switching (ZVS) meaning that the switch S0 turns on with the voltage drop across its drain to source terminals being equal to or approximately 0V. Thus, the parasitic supply loop inductor L0 advantageously permits zero voltage switching for the high side transistor switch S0.

The diode D0 of the unidirectional decoupling capacitor circuit 125 conducts when its anode is at least approximately 0.6V greater than its cathode. When the voltage on the VIN_AUX node dips to approximately 0 V at 202 in FIG. 2, the anode of diode D0 also drops thereby preventing diode D0 from turning on and causing capacitor C1 to be electrically disconnected from S0 and from the VIN_AUX node. This operating state further facilitates zero voltage switching for S0. Otherwise, if the capacitor C1 had been electrically connected to S0 and without the reverse bias state of the diode, the voltage on the VIN_AUX node would have been equal to the capacitor voltage.

However, when the voltage on VIN_AUX begins to ring, the voltage on VIN_AUX (and thus on D0's anode) may increase to a level that is more than 0.6V greater than the diode's cathode. An example of that point is shown at 210 in FIG. 2. When the diode D0 turns on due to the ringing, current from the VIN_AUX node flows through the diode D0 to the capacitor C1 and begins to charge the capacitor, and does so until the voltage on the VIN_AUX node drops too low for the diode D0 to remain on. As such, charge from the VIN_AUX node is used to charge the capacitor C1, which reduces the magnitude of the ringing voltage itself on the VIN_AUX node. Further, with the ringing voltage on the VIN_AUX node being reduced due to the use of the unidirectional decoupling capacitor circuit 125, the magnitude of the ringing voltage on the switch node VSW also is beneficially reduced.

When S0 is subsequently turned off by the controller 114, energy stored in parasitic inductor L0 causes overshoot at 215 at the drain of the high side transistor switch S0. Diode D0 then forward biases to store this energy in capacitor C1 thereby curtailing the magnitude of the overshoot. The controller 114 then turns on low side transistor switch S1 after the dead time, and the process repeats.

The charge stored in the capacitor C1 should be removed to permit additional charge to be stored in the capacitor each cycle. The energy stored in the capacitor can be used to power an additional load (e.g., load 170 in FIG. 1). The load 170 powered in full or in part by the capacitor C1 may comprise gate drives, control circuits, or other power management circuits such as low drop-out voltage regulators, etc. Load 170 may be an external load altogether from the module containing the voltage converter 110.

Figure 3:
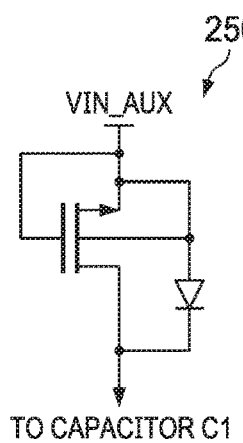
FIG. 3 shows an example of an implementation of a diode in the unidirectional decoupling capacitor circuit.

FIG. 3 shows an example of an implementation of diode D0 as a structure 250. Structure 250 in this example is a MOSFET configured as a diode. A MOSFET configured as a diode enables diode D0 to be realized in the IC and thereby eliminate any extra equivalent series inductance (ESL). D0 can be realized using a similar voltage rated MOSFET as S0 and sized appropriately to handle peak currents.

Certain terms are used throughout the following description and claims to refer to particular system components. Different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a high side transistor switch coupled to a first voltage node;
   a low side transistor switch coupled to the high side transistor switch at a switch node; and
   a unidirectional decoupling capacitor circuit including a capacitive component, wherein the unidirectional decoupling capacitor circuit is coupled between the first voltage node and a common potential, the unidirectional decoupling capacitor circuit configured to block current from flowing from the capacitive component to the first voltage node;
   wherein, responsive to a voltage on the first voltage node beginning to ring by more than a non-zero threshold, the unidirectional decoupling capacitor circuit is configured to sink current from the first voltage node to the capacitive component.

2. The system of claim 1 further comprising:
   an output inductor coupled to the switch node;
   a first load coupled to the output inductor; and
   a second load coupled to the unidirectional decoupling capacitor circuit to discharge at least some charge from the capacitive component.

3. The system of claim 2, wherein the second load includes at least one of gate drive, a control circuit, or a power management circuit.

4. The system of claim 1, wherein the unidirectional decoupling capacitor circuit comprises a diode coupled in series with the capacitive component.

5. The system of claim 4, wherein:
   the diode includes an anode and a cathode;
   the anode is connected to the first voltage node;
   the cathode is connected to a first terminal of the capacitive component; and
   a second terminal of the capacitive component is connected to the common potential.

6. The system of claim 4, wherein:
   the diode includes an anode and a cathode and the capacitive component includes a first terminal and a second terminal;
   the first terminal is connected to the first voltage node;
   the second terminal is connected to the anode of the diode; and
   the cathode is connected to the common potential.

7. The system of claim 1, wherein the unidirectional decoupling capacitor circuit comprises a metal oxide semiconductor field effect transistor (MOSFET) configured as a diode and coupled in series with the capacitive component.

8. The system of claim 1, wherein the unidirectional decoupling capacitor circuit and the high and low side transistor switches are fabricated on a common semiconductor die.

9. In a system having a high side transistor coupled to a first voltage node and a low side transistor coupled to the high side transistor at a switch node, a circuit comprising:
   an output inductor connected to the switch node;
   an output capacitor connected between the output inductor and a common potential; and a series combination of a diode and a capacitive component connected between the first voltage node and the common potential;

wherein, responsive to a voltage on the first voltage node beginning to ring by more than a non-zero threshold, the diode turns on and current flows from the first voltage node to the capacitor to thereby charge the capacitive component, the diode configured to block current from flowing from the capacitive component to the first voltage node.

10. The system of claim 9, wherein an anode of the diode is connected to the first voltage node and a cathode of the diode is connected to the capacitive component.

11. The system of claim 9, wherein the capacitive component is connected to the first voltage node and an anode of the diode is connected to the capacitive component.

12. The system of claim 9, wherein the diode comprises a metal oxide semiconductor field effect transistor (MOSFET) configured as a diode.

13. The system of claim 9, wherein the diode, the capacitive component, the high side transistor switch, and the low side transistor switch are fabricated on a common semiconductor die.

14. The system of claim 9, wherein charge from the capacitive component is used to power a load.

15. A system, comprising:
a high side transistor switch coupled to a first voltage node;
a low side transistor switch coupled to the high side transistor switch at a switch node; and
a unidirectional decoupling circuit including a charge storage component, wherein the unidirectional decoupling circuit is coupled between the first voltage node and a common potential, the unidirectional decoupling circuit configured to block current from flowing from the charge storage component to the first voltage node;

wherein, responsive to a voltage on the first voltage node beginning to ring by more than a non-zero threshold, the unidirectional decoupling circuit is configured to sink current from the first voltage node to charge the charge storage component.

16. The system of claim 15, wherein the charge storage component includes a capacitor.

17. The system of claim 16, wherein the unidirectional decoupling circuit also includes a diode.

18. The system of claim 16, wherein:
the unidirectional decoupling circuit also includes a diode having an anode and a cathode;
the anode is connected to the first voltage node;
the cathode is connected to the capacitor; and
the capacitor is connected to the common potential.

19. The system of claim 15, further comprising a load, and wherein charge from the charge storage device is used to power the load.

* * * * *